United States Patent
Geuss et al.

(10) Patent No.: US 6,782,400 B2
(45) Date of Patent: Aug. 24, 2004

(54) METHOD AND SYSTEM FOR TRANSFERRING DATA BETWEEN SERVER SYSTEMS

(75) Inventors: Jo-Ann M. Geuss, Woodstock, NY (US); Stanely P. Hirsch, Poughkeepsie, NY (US); William M. Houston, Colchester, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 09/886,062

(22) Filed: Jun. 21, 2001

(65) Prior Publication Data

US 2002/0198897 A1 Dec. 26, 2002

(51) Int. Cl.$^7$ ............................................. G06F 17/30
(52) U.S. Cl. ...................................... 707/200; 707/205
(58) Field of Search ............................. 707/1, 6, 7, 10, 707/102, 200; 705/4

(56) References Cited

U.S. PATENT DOCUMENTS

| | | | |
|---|---|---|---|
| 5,021,995 A | 6/1991 | Quint et al. | 364/900 |
| 5,848,426 A | 12/1998 | Wang et al. | 707/505 |
| 5,857,194 A * | 1/1999 | Kelliher et al. | 707/101 |
| 5,890,129 A * | 3/1999 | Spurgeon | 705/4 |
| 5,893,131 A | 4/1999 | Kornfeld | 707/531 |
| 5,950,196 A * | 9/1999 | Pyreddy et al. | 707/5 |
| 5,983,240 A | 11/1999 | Shoroff et al. | 707/200 |
| 6,105,030 A * | 8/2000 | Syed et al. | 707/10 |
| 6,381,600 B1 * | 4/2002 | Lau | 707/6 |

FOREIGN PATENT DOCUMENTS

JP       5073567 A     3/1993

OTHER PUBLICATIONS

Miscisin, J. Michael, "Data Transfer Between SAS Software and Other PC Software," Mar. 1996, Proceedings of the 21st Annual SAS Users Group International Conference, vol. 1, pp. 543–547.

Raeder, A., Tung, S., "Downloading and Converting Bibliographic Records from Mainframe to Micro Using dBASE," Microcomputers for Information Management, Mar. 1989, 6(1), pp. 11–32.

"File Transfer Utilities (dbimp, dbexp)," Chapter 10, http://www.dbstar.org/doc/UG_Ch10.htm.

* cited by examiner

Primary Examiner—Diane D. Mizrahi
(74) Attorney, Agent, or Firm—Ronald A. D'Alessandro; Hoffman, Warnick & D'Alessandro LLC

(57) ABSTRACT

The present invention provides a method and system for transferring data between server systems. Specifically, the present invention provides a method and system for locating and importing data stored on a source server system in a first file format to a staging server system. Once imported to the staging server system, the data is processed (e.g., parsed, edited, and translated). After processing, the data is formatted into a second file format and then exported to a destination server system. Thus, the present invention allows data stored on a source server system in a first file format to be transferred to a destination server system in a second file format.

31 Claims, 7 Drawing Sheets

| ACCTGRP ID (82A) | SERV TYPE (82B) | SERVICE DESC (82C) | CURR MONTH PLAN $ (82D) | CURR MONTH ACTUAL $ (82E) | DELTA $ (82F) | (82G) | YTD PLAN $ (82H) | YTD ACTUAL $ (82I) |
|---|---|---|---|---|---|---|---|---|
| FOEMLS | ADM | CAP LONG | $0 | $676 | $676 | | $0 | $18,726 |
| | LBR | LONG | $443,135 | $336,276 | -$106,859 | | $1,883,755 | $1,370,388 |
| | MNT | LONG | $0 | $101,624 | $101,624 | | $0 | $391,220 |
| ADM Totals (84A) | | | $443,135 | $438,575 | -$4,559 | | $1,883,755 | $1,780,334 |
| ENG Totals (84B) | ENG | LBR LONG | $0 | $0 | $0 | | $0 | $1,104 |
| | | | | | | | | $1,104 |
| | GVI | TELE EXTNS | $4,218 | $3,753 | -$465 | | $16,872 | $16,407 |
| | | TELE TOLLS | $3,355 | $3,096 | -$259 | | $13,421 | $12,026 |
| GVI Totals (84C) | | | $7,573 | $6,848 | -$725 | | $30,293 | $28,433 |
| | LBR | BILL SHORT | $0 | $146,644 | $146,644 | | $0 | $146,662 |
| LBR Totals (84D) | | | $0 | $146,644 | $146,644 | | $0 | $146,662 |
| | MVS | CPU OFF | $12,156 | $22,005 | $9,849 | | $51,676 | $82,069 |
| | | CPU PRIME | $10,252 | $16,174 | $5,922 | | $43,581 | $44,406 |
| | | DASD | $4,910 | $6,217 | $1,307 | | $19,640 | $22,944 |
| | | TAPE | $808 | $205 | -$603 | | $3,434 | $1,073 |

METHOD AND SYSTEM FOR TRANSFERRING DATA BETWEEN SERVER SYSTEMS

BACKGROUND OF THE INVENTION

1. Technical Field

The present invention generally relates to a method and system for transferring data between server systems. In particular, the present invention relates to a method and system for transferring data stored on a source server system as an ASCII flat file to a destination server system as a report file.

2. Background Art

As the use of technology in business becomes more prevalent, business entities are increasingly utilizing Information Technology (IT) to disseminate business information. For example, a business entity might have raw financial data that needs to be disseminated to various personnel. Oftentimes, the raw financial data is stored in a particular location and is in a particular format. However, the personnel receiving the data might not be able to readily locate the data file. Moreover, the particular format in which the raw data is stored might not be not conducive for reporting to the personnel. For example, the raw data could be stored as a column delimited ASCII flat file, which is difficult to read and interpret.

Heretofore, attempts have been made to provide a more efficient system for disseminating data. Such systems, however, do not provide a way to transfer the data between server systems while altering the format in which the data is stored. Specifically, existing systems do not provide an efficient way to transfer a data from a source server system in a first file format to a destination server system in a second file format. In contrast, existing systems merely copy the data directly from the first server system to the destination server system in the first file format. If conversion to a different file format is desired, existing systems require numerous personnel to manually re-format the data. Such efforts not only add considerable costs to the business, but also routinely produce a file that is wrought with errors.

In addition, due to the rapid pace of change in today's business environment, data (especially financial data) is in constant flux. However, existing systems fail provide a way for data to be transferred from a source server system in a first file format to a destination server system in a second file format according to a predefined schedule. In contrast, existing systems rely on periodic manual transfers.

In view of the foregoing, there exists a need for a method and system for transferring data between server systems. A need exists for such a method and system to be able to format the data from a first file format to a second file format during transfer. A further need exists for the data transfer to occur according to a predefined schedule.

SUMMARY OF THE INVENTION

The present invention overcomes the drawbacks of existing systems by providing a method and system for transferring data between server systems. In general the method and system of the present invention locates and imports data stored on a source server system in a first file format to a staging server system. On the staging server system, the data is processed, formatted into a second file format, and exported to a destination server system. The present invention allows this transfer to occur according to a predefined schedule.

According to a first aspect of the present invention, a method for transferring data between server systems is provided. The method comprises the steps of: (1) receiving data as a flat file from a first server system in a second server system; (2) processing the data in the flat file on the second server system according to predefined processing rules; and (3) exporting the processed data from the second server system to a third server system as a report file.

According to a second aspect of the present invention, a method for transferring data between server systems is provided. The method comprises the steps of: (1) importing data as a flat file from a first server system to a second server system according to predefined configuration rules, and import schedule rules; (2) processing the data in the flat file on the second server system according to predefined parsing rules, editing rules, and translation rules; and (3) exporting the processed data as a report file from the second server system to a third server system according to predefined formatting rules and export schedule rules.

According to a third aspect of the present invention, a method for transferring data between server systems is provided. The method comprises the steps of: (1) locating data as an ASCII flat file on a first server system according to predefined configuration rules; (2) importing the flat file from the first server system to a second server system according to predefined import schedule rules; (3) parsing the data in the flat file to identify data points according to predefined parsing rules; (4) editing the data in the flat file according to predefined editing rules; (5) translating the data in the flat file into a predefined standard according to predefined translation rules; (6) formatting the data in the flat file into a report file according to predefined formatting rules; and (7) exporting the report file from the second server system to a third server system according to predefined export schedule rules.

According to a fourth aspect of the present invention, a system for transferring data between server systems is provided. The system comprises: (1) an import system for importing data as a flat file from a first server system to a second server system and for processing the imported data on the second server system, according to predefined import system rules; and (2) an export system for formatting the processed flat file into a report file and for exporting the report file from the second server system to a third sever system, according to predefined export system rules.

According to a fifth aspect of the present invention, a system for transferring data between server systems is provided. The system comprises: (1) an import system for importing data as a flat file from a first server system to a second server system according to predefined configuration rules and import schedule rules, and for processing the data in the flat file on the second server system according to predefined parsing rules, editing rules, and translation rules; and (2) an export system for formatting the processed flat file into a report file according to predefined formatting rules, and for exporting the report file from the second server system to a third sever system according to predefined export schedule rules.

According to a sixth aspect of the present invention, a system for transferring data between server systems is provided. The system comprises: (1) an import system for importing data as an ASCII flat file from a first server system to a second server system and for processing the data in the flat file on the second server system, wherein the import system comprises a configuration system for locating the flat file, an import schedule system for importing the flat file from the first server system according to a predefined import schedule, a parsing system for identifying data points in the flat file, an editing system for editing the data, and a translation system for translating the data into a predefined standard; and (2) an export system for formatting the processed flat file into a report file and for exporting the report file from the second server system to a third sever system, wherein the export system comprises a formatting system for formatting the processed flat file into a report file, and an export schedule system for exporting the report file from the second server system to the third server system according to a predefined export schedule.

According to a seventh aspect of the present invention, a program product stored on a recordable medium for transferring data between server systems is provided. When executed, the program product comprises: (1) an import system for importing data as a flat file from a first server system to a second server system according to predefined configuration rules and import schedule rules, and for processing the imported data on the second server system according to predefined parsing rules, editing rules, and translation rules; and (2) an export system for formatting the processed flat file into a report file according to predefined formatting rules, and for exporting the report file from the second server system to a third sever system according to predefined export schedule rules.

Therefore, the present invention provides a method and system for transferring data between server systems.

BRIEF DESCRIPTION OF THE DRAWINGS

These and other features and advantages of this invention will be more readily understood from the following detailed description of the various aspects of the invention taken in conjunction with the accompanying drawings in which:

FIG. 4 depicts an exemplary view of a flat file.

FIG. 5 depicts an exemplary view of a flat file data table.

Figure 1:
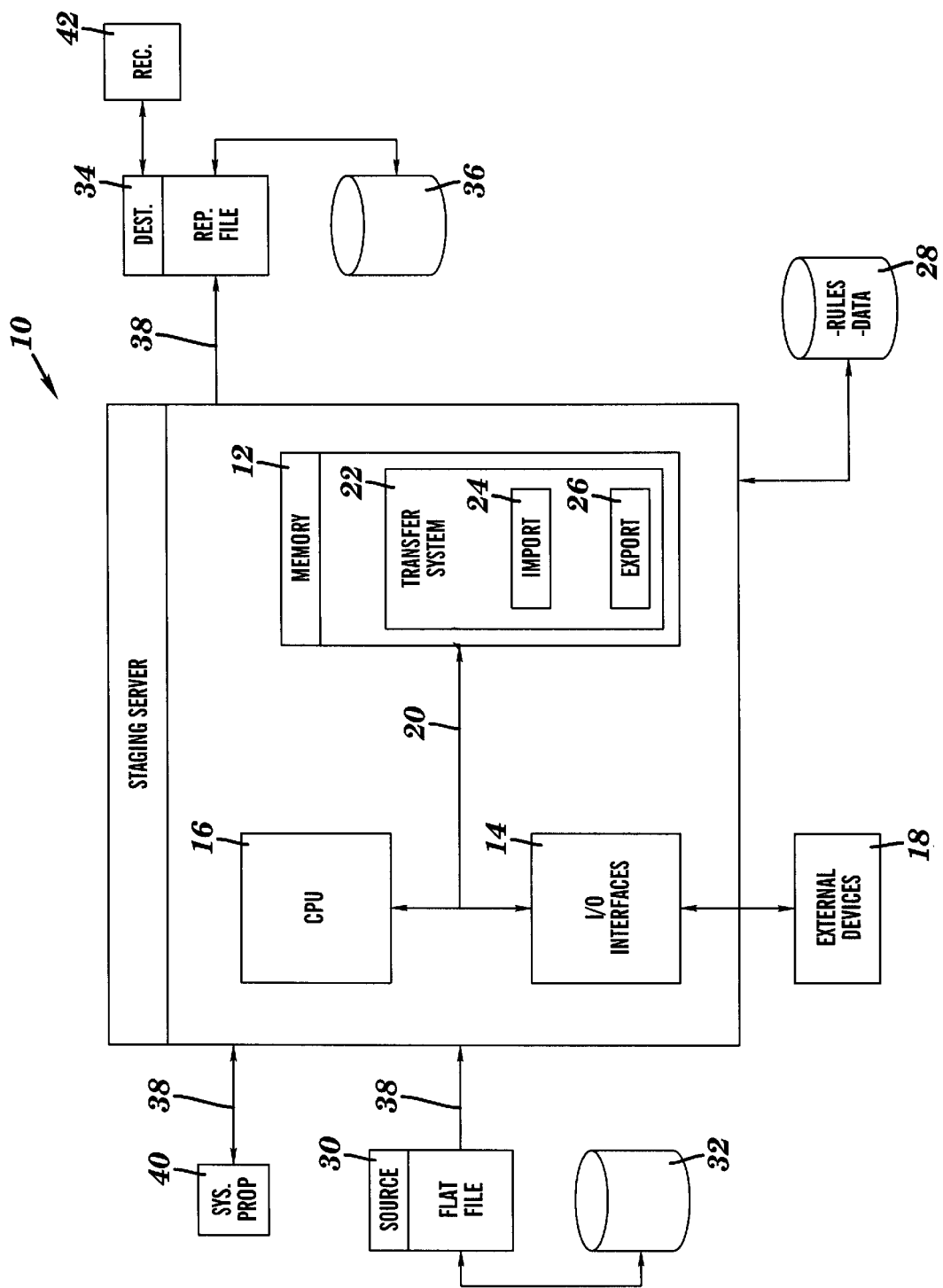
FIG. 1 depicts a computer system having a transfer system, according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION TO THE DRAWINGS

For convenience, this description will have the following sections:

I. Computer System
II. Transfer System
I. Computer System

In general, the present invention provides a method and system for data stored in a first file format on a source server system to be transferred to a destination server system in a second file format. Specifically, the present invention locates data as an ASCII flat file on the source server system. Once located, the flat file is imported to a staging server system. On the staging server system, the data is stored in a database and processed. The processing includes parsing, editing and translation of the data. After processing, the data is formatted into a report file, which is then exported to the destination server system. At the destination server system, a recipient can view or manipulate the data. Preferably, the importing of the flat file from the source server system and the exporting of the report file to the destination server system is performed according to a predefined schedule. This helps ensure that data is routinely transferred to the destination server system.

Referring now to FIG. 1, a staging server system 10 that includes the transfer system 22 of the present invention is shown. Staging server system 10 generally comprises memory 12, input/output interfaces 14, a central processing unit (CPU) 16, external devices/resources 18, bus 20, and database 28. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the staging server system 10 and likewise may comprise any known type of transmission link, including electrical, optical, wireless, etc. In addition, although not shown, additional components, such as cache memory, communication systems, system software, etc., may be incorporated into staging server system 10.

Stored in memory 12 is transfer system 22 (shown in FIG. 1 as a software product). Transfer system 22 will be described in more detail below but generally comprises import system 24 and export system 26, which transfer data stored on source server system 30 in a first file format to destination server system 34 in a second file format. Once at destination server system, the data can be viewed in the second file format by recipient(s) 42.

Database 28 provides storage for information necessary to carry out the present invention. Such information could include, inter alia: (1) the data transferred between source server system 30 and destination server system 34; and (2) predefined rules used by staging server system 10 to locate, import, parse, edit, translate, format, and export data to destination server system 34. The predefined rules in database 28 are preferably input by a user (i.e., system proprietor 40) and can vary depending on the business entity and/or recipient(s) 42. This allows the present invention to be tailored to specific business entities.

Database 28 may comprise one or more storage devices, such as a magnetic disk drive or an optical disk drive. In another preferred embodiment, database 28 includes data distributed across, for example, a local area network (LAN), wide area network (WAN) or a storage area network (SAN) (not shown). Database 28 may also be configured in such a way that one of ordinary skill in the art may interpret it to include one or more databases.

As will be described in further detail below, import system 24 locates data stored as an ASCII flat file on source server system 30. Once located, the ASCII flat file is imported to staging server system 10. On staging server system 10, the data will be stored in database 28 and processed (e.g., parsed, edited, and translated). After processing, export system 26 will format the data into a report file and export the report file to destination server system 34. It should be understood, that although not shown, source server system 30 and destination server system 34 preferably include components (e.g., memory, CPU, I/O interfaces, external devices, etc.) similar to staging server system 10. Such components are not shown for brevity purposes only. Moreover, as depicted, source server system 30 and destination server system 34 include databases 32 and 36, respectively. Databases 32 and 36 store data files for transfer to/from staging server system 10. Moreover, it should be understood that databases 32 and 36 are similar to database 28. Specifically, databases 32 and 36 may each comprise one or more storage devices, such as a magnetic disk drive or an optical disk drive. In another preferred embodiment, databases 32 and 36 each include data distributed across, for example, a local area network (LAN), wide area network (WAN) or a storage area network (SAN) (not shown). Databases 32 and 36 may also be configured in such a way that one of ordinary skill in the art may interpret each to include one or more databases.

Communication with staging server system 10 occurs via communication links 38. Communications links 38 can include a direct terminal connected to the staging server system 10. Alternatively, source server system 30 and destination server system 34 could be connected to staging server system 10 as remote systems in a client-server (or server-server) environment. In such a case, server systems 10, 30, and 34 may be connected via the Internet, wide area networks (WAN), local area networks (LAN) or other private networks. Server systems 10, 30, and 34 may utilize conventional token ring connectivity, Ethernet, or other conventional communications standards. Where server systems 10, 30, and 34 are connected via the Internet, connectivity could be provided by conventional TCP/IP sockets-based protocol. In this instance, server systems 10, 30 and 34 would utilize an Internet service provider outside the system to establish connectivity to staging system server 10.

It is understood that the present invention can be realized in hardware, software, or a combination of hardware and software. Moreover, each server system 10, 30, and 34 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls staging server system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

II. Transfer System

Figure 2:
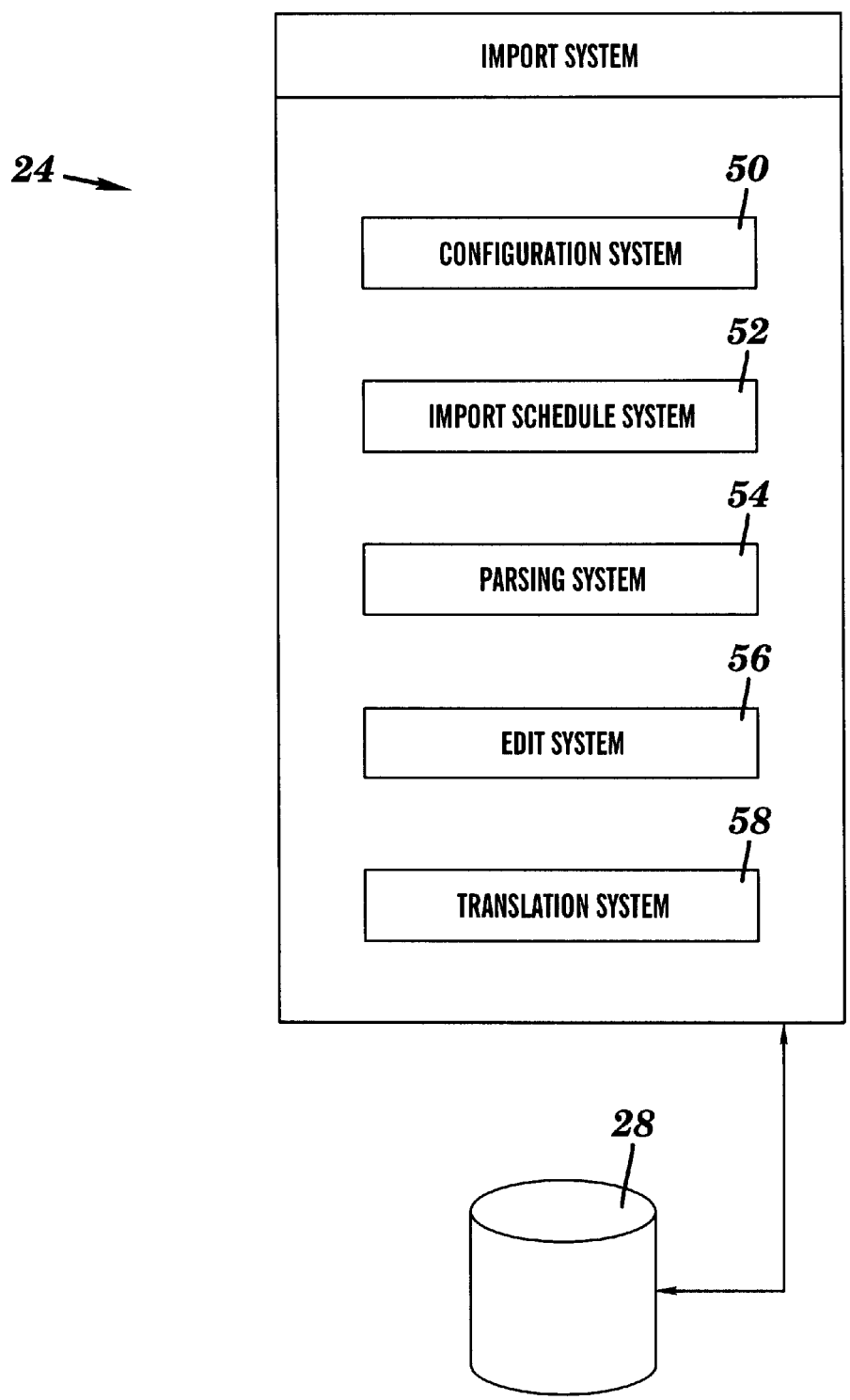
FIG. 2 depicts a box diagram of the import system of the transfer system of FIG. 1.

Referring now to FIG. 2, import system 24 is depicted in greater detail. In general, import system 24 accesses database 28 to provide predefined import system rules, which allow for data to be retrieved from the source database and processed. As depicted, import system 24 includes configuration system 50, import schedule system 52, parsing system 54, editing system 56, and translation system 58, each of which will be further described below.

Configuration system 50 accesses configuration rules in database 28 to locate a data file on the source server system. As indicated above, a business entity might have numerous business applications, each of which have a unique set of data. Storage for this data is often a complex issue. Configuration system 50 allows data to be efficiently located.

Figure 3:
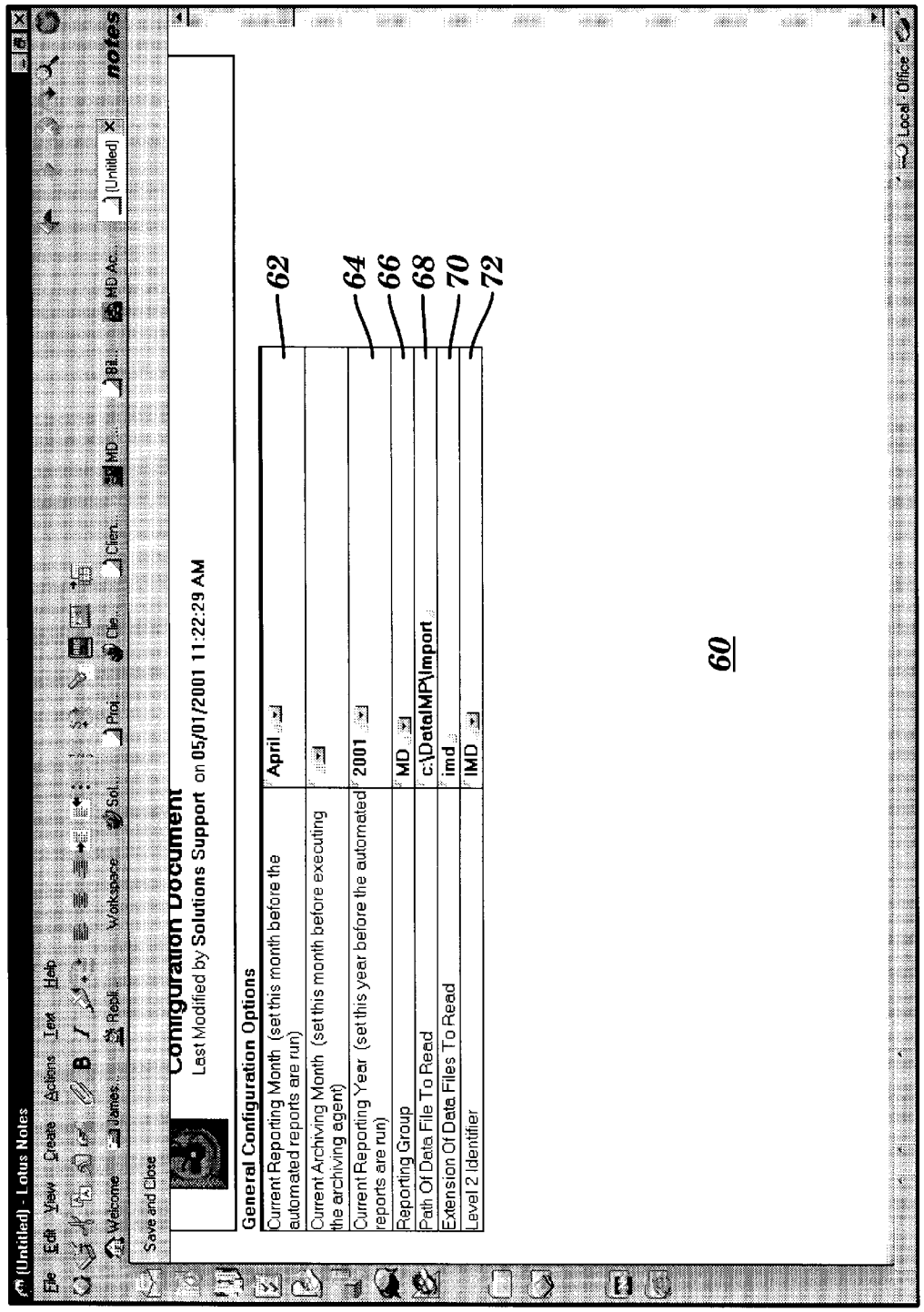
FIG. 3 depicts an exemplary view of a configuration system.
Figure 5:
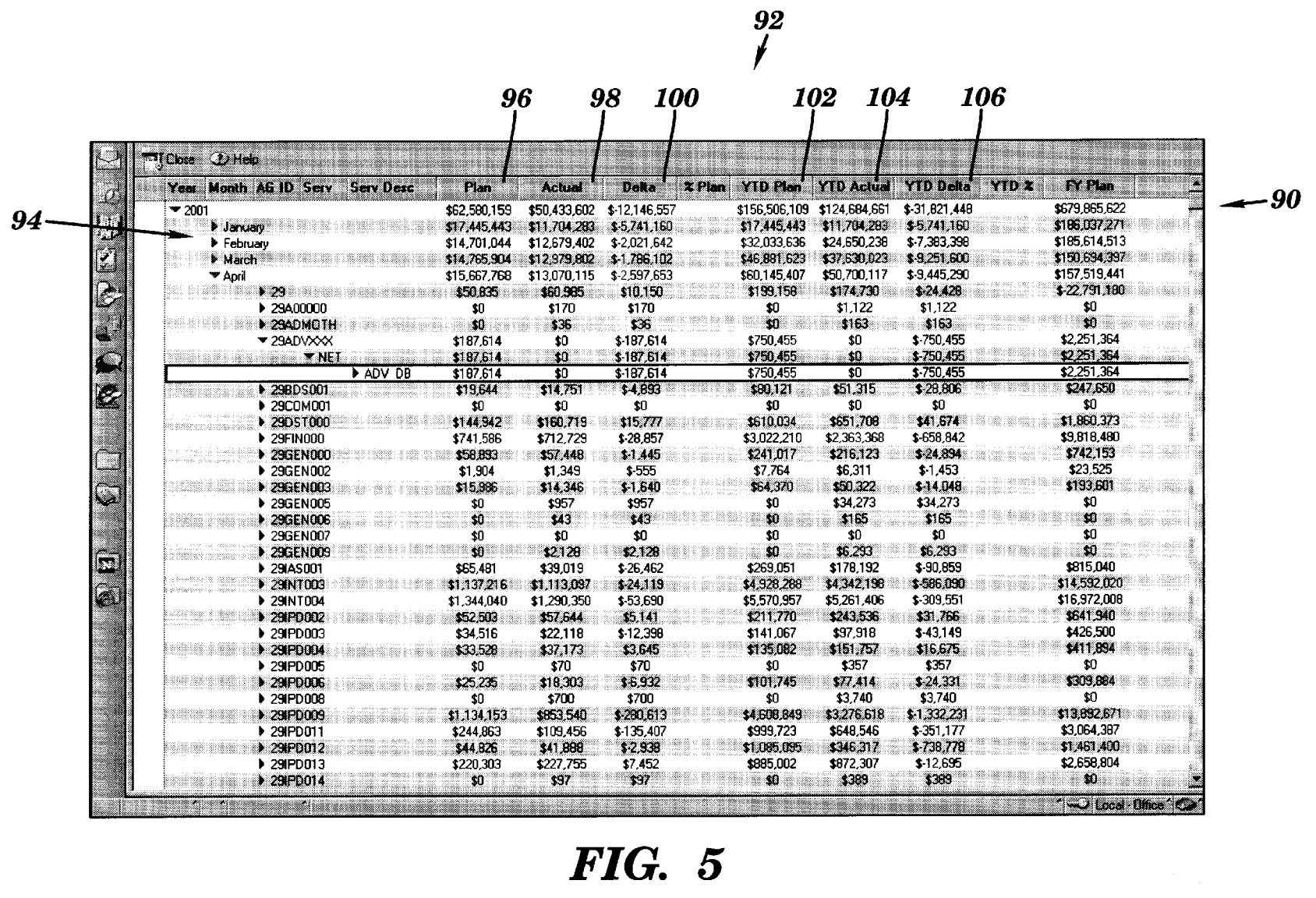

Referring to FIG. 3, a view 60 of configuration system 50 is shown. As depicted, configuration system 50 allows a user (e.g., a system proprietor as shown in FIG. 1) to designate precise configuration details to locate the data to be transferred. Specifically, if the user desired to transfer billing data to the destination server system, he/she could designate, among other things, a reporting month 62 (e.g., April) corresponding to the billing data, a reporting year 64 (e.g., 2001), a particular reporting group 66 (e.g., Microelectronics Division), a data path 68 (e.g., c:/DataIMP/Import), a data file extension 70 (e.g., imd), and any addition data identifiers 72 (e.g., IMD). Thus, the user could particularly identify the location of a specific data file. The configuration rules stored in database 28 provide the user with all available choices via the configuration system 50. Specifically, the configuration rules provide the user only with the choices that pertain to the particular business entity. Thus, for example, when selecting a reporting group 74, the user would only be presented with choices that pertained the specific business entity for which data is being transferred. Accordingly the configuration rules are preferably tailored to a particular business entity. It should be understood that the configuration details shown in FIG. 5 are intended to be illustrative only and others could be implemented. For example, a specific source server system could be identified.

As indicated above, configuration system 50 allows data stored in a first file format to be located. Under the present invention, the first format is preferably an ASCII flat file (e.g., a column delimited file). However, it should be understood that the present invention allows a file in any format to be re-formatted and transferred between systems, and that ASCII flat file format is used for exemplary purposes only.

FIG. 4 depicts an exemplary ASCII flat file 80. Although beneficial for storing data, the ASCII flat file format is often confusing for most personnel to utilize. Accordingly, re-formatting of the data therein is often desired as the data is being transferred to the destination server system. As shown, ASCII flat file 80 includes various columns 82A–I and rows 84A–E. Each row 84A–E corresponds to a different type of data. For example, row 84A could correspond to billing data, while row 84B could correspond to accounts payable data. If a user selected a billing data row, the user would be presented with a table of billing data points.

FIG. 5 depicts table 90 of billing data points. As shown, table 90 arranges billing data in columns and rows. Various billing data categories 92 are arranged in the columns, while time frames 94 are arranged in the rows. Examples of billing data categories include planned billings 96, actual billings 98, difference between planned and actual billings 100, year to date planned billings 102, year to date actual billings 104, and year to date difference 106 between planned and actual billings. As indicated above, it might be the case that the intended recipient either cannot interpret the data in these categories, or has no use for some of the categories. Thus, the data could be re-formatted into a more suitable "report-"format (as will be further described below).

Referring back to FIG. 2, once the (ASCII flat) data file has been located, import schedule system 52 will import the file. Similar to configuration system 50, import schedule system 52 is governed by predefined import schedule rules in database 28. Import schedule rules allow the data file to be imported according to a predetermined schedule. For example, if a particular data file is updated monthly, import schedule system 52 can schedule monthly imports.

Once the data file is imported, the data will be stored in database 28 and processed according to predefined processing rules. Processing the data includes parsing, editing, and translation. Parsing is performed to identify any relevant data points in the flat file. Identification of the data points is necessary for accurate formatting of the data. For example, parsing could be performed to identify which columns of the flat file table (90 of FIG. 5) correspond to "Billing Month" and "Account Group." If parsing is not performed, the data could be erroneously formatted so that, for example, "Billing Month" data could be switched with "Account Group" data. Moreover, as indicated above, recipient(s) of the data might not need to view all data in the flat file. Parsing also allows a limited number of data points to be identified. To perform the parsing, parsing system 54 accesses database 28 to retrieve the predefined parsing rules. Since each business entity could arrange uniquely its data, the parsing rules could vary. In addition, since only portions of the data might be forwarded to the recipient(s), the parsing rules could be used to identify only those data points. For example, if the recipient(s) need only to receive "Account Group" data, the parsing rules will dictate that only "Account Group" data points are identified. This allows selective segments of the data to be forwarded to the recipient.

Once the data is parsed, edit system 56 will retrieve predefined editing rules from database 28. The edit rules instruct edit system 56 to, among other things, eliminate any unnecessary data. For example, the data in the flat file could include blank lines that need to be removed prior to formatting. Edit system 56 will perform this operation. In addition, the flat file table (of FIG. 5) could include a time/date stamp or header information that are of little value to the recipient(s). Similarly, edit system 56 will remove this data. The manner in which the data is edited will depend upon the needs of the business entity and the information that is desired to be forwarded to the recipient(s). Accordingly, similar to the previously described rules, the editing rules could vary depending on the business entity and/or the recipient.

Translation system 58 accesses database 28 to provide predefined translation rules. Specifically, translation system 58 utilizes the translation rules to translate the data into a standard predefined by the business entity. For example, financial figures in the flat file table (FIG. 5) might be expressed with five decimal places (e.g., $5.0234). However, when forwarded to the recipient via the destination server system, three decimal places might suffice (e.g., $5.02). Translation system 58 will make any such changes to the data to place it in the predefined standard. Because the standard is based upon the needs of the business entity's and/or the recipient(s), the translation rules could vary.

Although parsing, editing, and translation of the data has been described as occurring in a particular order. It should be appreciated that parsing, editing, and translation could occur in any order. For example, the data could be edited, translated and then parsed.

Figure 6:
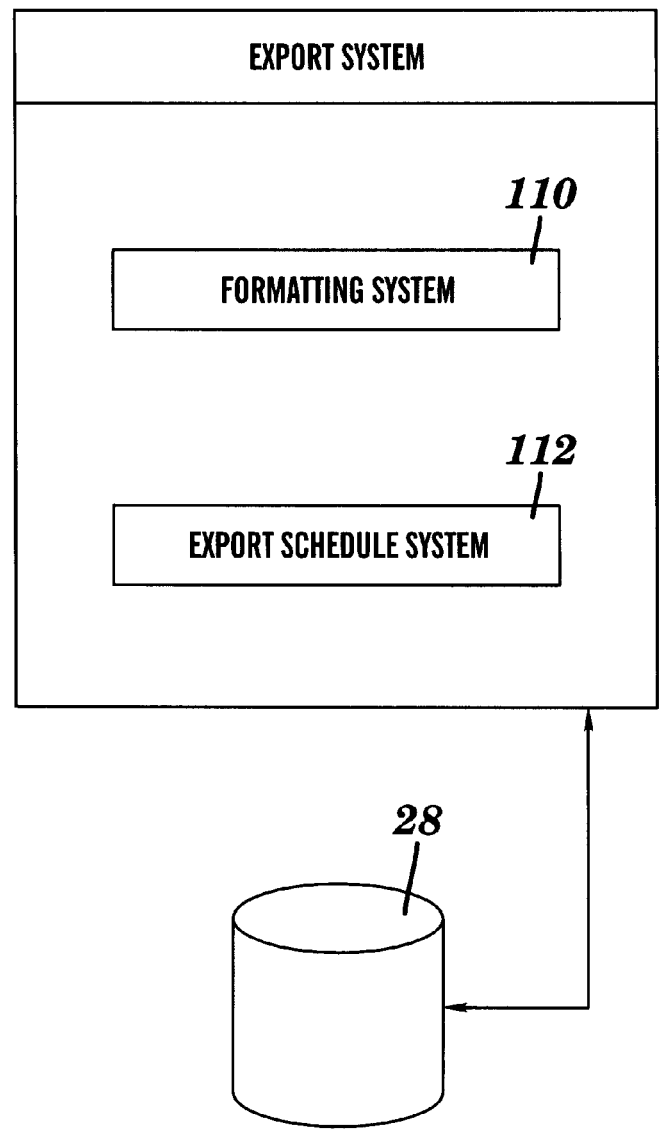
FIG. 6 depicts a box diagram of the export system of the transfer system of FIG. 1.

Once the data has been processed, it can be formatted into the second file format and forwarded to the destination server system for the recipient. Referring now to FIG. 6, export system 26 of the transfer system is shown in greater detail. Export system 26 includes formatting system 110 and export schedule system 112 and accesses database 28 to retrieve predefined export system rules. Formatting system 110 utilizes predefined formatting rules to format the data into a second format (hereinafter "report format") to be forwarded to the destination server system. As explained above, the data is imported into the staging server system in a first file format (e.g., as an ASCII flat file). However, before it can be forwarded to the recipients via the destination server system is must be formatted into a file format (i.e., a report format) that is more conducive to review by the recipients. Formatting system 110 provides this function.

Figure 7:
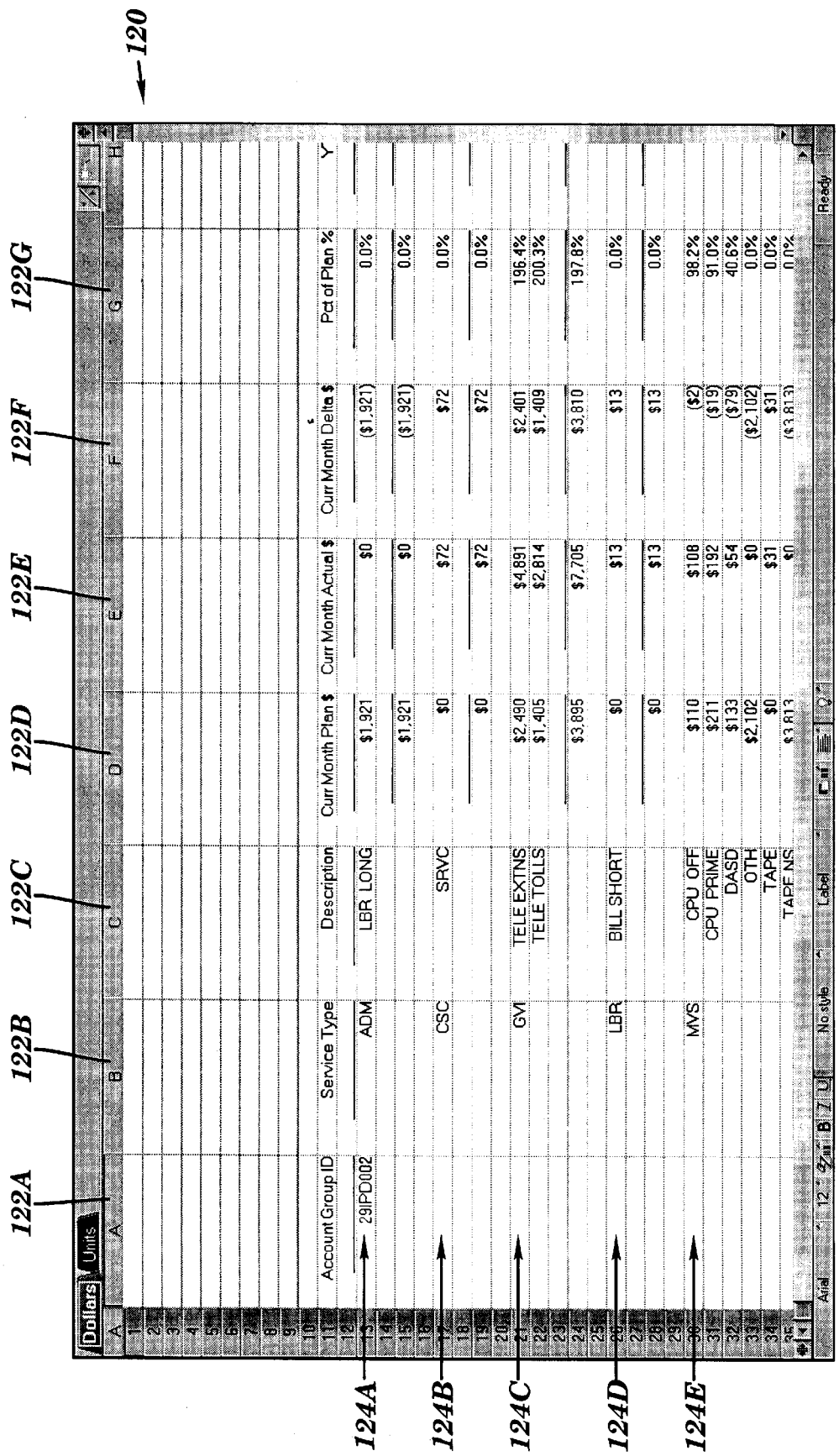
FIG. 7 depicts an exemplary view of a report file.

FIG. 7 depicts an example report data table 120 from a report file. Report data table 120 includes the data originally imported in the ASCII flat file, but formatted as shown, which is more easily read and interpreted by the recipient(s). As depicted, report data table 120 includes columns 122A–G and rows 124A–E of data. However, only certain segments of data are presented. The segments present reflect the data points identified as relevant by the data parsing operation described above. Formatting system 110 takes the identified data points and arranges them into report data table 120 as shown. Specifically, formatting system 110 uses the formatting rules to arrange the data in a particular order, fashion, etc. For example, the formatting rules could dictate that data should be arranged into a particular sequence of columns/rows (e.g., arrange "Planned Billings" in Column 122D and "Actual Billings" in Column 122E), typeface convention (e.g., boldface all column headers, italicize the column header for Column 122A), etc. Thus, since the data could be formatted in any fashion, the formatting rules are preferably predefined according to the needs of the business entity and/or the recipient(s).

Referring back to FIG. 6, once the data has been formatted into a report file, export system 112 will export the report file to the destination server system for review by the recipient(s). Specifically, export system 112 will access database 28 to retrieve predefined export schedule rules. Export schedule rules control when the report file will be exported. As indicated above, data could be updated at various time intervals. Export schedule system 112 helps ensure that updated data is routinely forwarded to the destination server system. This can be accomplished by designating a predefined export schedule in export schedule rules. For example, the export schedule rules could dictate that a report file be exported every week. Preferably, the report file is exported as frequently as the ASCII flat file is imported. In addition, the location of the destination server system is preferably designated in the export schedule rules. For example, the export schedule rules could dictate that the report file be exported to a particular Internet address. Alternatively, the location of the destination server system could be identified by the configuration system rules.

Once the report file is received by the destination server system, the recipient(s) are free to view and/or manipulate the data therein. Thus, the present invention provides a method and system for efficiently transferring data stored on a source server system in a first file format to a destination server system in a second format.

As indicated above, all rules used by import system 24 and export system 26 are preferably predefined according to the needs of the business entity and/or the recipient(s) by a system proprietor. This allows the present invention to be tailored to specific business entities. For example, the location of data and the frequency of change thereof could vary between business entities. Thus, configuration rules and import schedule rules would be predefined for each business entity. Although import system 24 and export system 26 have been shown and described as separate systems, each having separate sub-systems, it should be understood that the present invention could be embodied in any quantity of systems and/or subsystems. For example, import system 24 and export system 26 could exist as a single system.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for transferring data between server systems, comprising the steps of:
    importing data as a flat file from a first server system on a second server system;
    processing the data in the flat file on the second server system according to predefined processing rules, wherein the predefined processing rules allow relevant data points for a user of a third server system to be selectively included the flat file in a predefined display standard;
    generating a report file based on the processed data on the second server system, wherein the report file comprises the relevant data points arranged for displaying to the user based on at least one requirement of the user; and
    exporting the report file from the second server system to the third server system, wherein the report file can vary for each of a plurality of users.

2. The method of claim 1, wherein the importing step comprises:
    locating the flat file according to predefined configuration rules; and
    importing the located flat file according to predefined import schedule rules.

3. The method of claim 1, wherein the processing step comprises the steps of:
    parsing the data in the flat file to identify the relevant data points for the user according to predefined parsing rules;
    editing the data in the flat file to remove unnecessary data for the user according to predefined editing rules; and
    translating the relevant data in the flat file into the predefined display standard according to predefined translation rules.

4. The method of claim 1, wherein the generating step includes formatting the processed data in the flat file into the report file according to predefined formatting rules; and wherein the report file is exported according to predefined export schedule rules.

5. The method of claim 1, wherein the flat file comprises a ASCII flat file.

6. The method of claim 5, wherein the ASCII flat file comprises a column delimited file.

7. The method of claim 1, farther comprising the step of storing the imported data on a database of the second server system.

8. A method for transferring data between server systems, comprising the steps of:
    importing data as a flat file from a first server system to a second server system according to user defined configuration rules, and import schedule rules;
    processing the data in the flat file on the second server system according to user defined parsing rules, editing rules, and translation rules;
    generating a report file based on the processed data on the second server system, wherein the report file is customized for a user of a third server system; and
    exporting the report file from the second server system to the third saver system according to user defined formatting rules and export schedule rules, wherein each of the rules is customized based on at least one requirement for each of a plurality of users.

9. The method of claim 8, wherein the flat file comprises an ASCII flat file.

10. The method of claim 9, wherein the ASCII flat file comprises a column delimited file.

11. The method of claim 8, further comprising the step of storing the import data on a database of the second server system.

12. A method for transferring data between server systems, comprising:
    locating data as an ASCII flat file on a first server system according to predefined configuration rules;
    importing the flat file from the first server system to a second server system according to predefined import schedule rules;
    parsing the data in the flat file on the second server system to identify data points that are relevant to a user of a third server system according to parsing rules;
    editing the data in the flat file to remove data that is unnecessary for the user according to editing rules;
    translating the data in the flat file into a predefined display standard for the user according to translation rules;
    formatting the data in the flat file into a report file on the second server system according to formatting rules that arrange the data for display to the user, wherein each of the parsing, editing, translation, and formatting rules can vary for each of a plurality of users based on at least one display requirement; and
    exporting the report file from the second server system to the third server system according to user defined export schedule rules.

13. A system for transferring data between server systems, comprising:
    an import system for importing data as a flat file from a first server system to a second server system and for processing the data in the flat file on the second server system, according to predefined import system rules, wherein the predefined import system rules selectively include relevant data points in the flat file translated into a predefined display standard based on a user of a third server system; and
    an export system for formatting the processed flat file into a report file and for exporting the report file from the second server system to the third sever system, according to predefined export system rules.

14. The system of claim 13, wherein the predefined import system rules comprise:
   configuration rules for locating the flat file;
   import schedule rules for importing the flat file from the first server system according to a predefined import schedule;
   parsing rules for identifying data points within the flat file;
   editing rules for editing the data in the flat file; and
   translation rules for translating the data into the predefined display standard.

15. The system of claim 13 wherein the predefined export system rules comprise:
   formatting rules for formatting the processed data into the report file; and
   export schedule rules for exporting the report file to the third server system according to a predefined export schedule.

16. The system of claim 13, wherein the imported data, the import system ruls, and the export system rules are stored on a database of the second server system.

17. The system of claim 13, wherein the flat file is an ASCII flat file.

18. The system of claim 17, wherein the ASCII flat file is a column delimited file.

19. A system for transferring data between server systems, comprising:
   an import system for importing data as a flat file from a first server system to a second server system according to predefined configuration rules and import schedule rules, an for customizing the imported data on the second server system for displaying to a user of a third server system according to parsing rules, editing rules, and translation rule that are each defined based on the user; and
   an export system for formatting the processed flat file into a report file according to predefined formatting rules, and for exporting the report file from the second server system to the third sever system according to predefined export schedule rules.

20. The system of claim 19, wherein the configuration rules locate the flat file, wherein the import schedule rules import the flat file from the first server system according to a predefined import schedule, wherein the parsing rules identify relevant data points in the flat file, wherein the editing rules edit the data to remove unnecessary data for the user, and wherein the translation rules translate the data into a predefined display standard.

21. The system of claim 19, wherein the formatting rules format the processed data into a report file, and wherein the export schedule rules export the report file to the third server system according to a predefined export schedule.

22. The system of claim 19, wherein each server system includes a database.

23. The system of claim 19, wherein the imported data, the import schedule rules, the configuration rules, the parsing rules, the editing rules, the translation rules, the formatting rules, and the export schedule rules are stored on a database of the second server system.

24. A system for transferring data between server systems, comprising:
   an import system for importing data as an ASCII flat file from a first server system to second server system and for processing the data in the flat file on the second server system to a customize the data for displaying to a user of a third server system, wherein the import system comprises a configuration system for locating the flat file, an import schedule system for importing the flat file from the first server system according to a predefined import schedule, a parsing system for identifying data points in the flat file that are relevant to the user, an editing system for editing the flat file to remove unnecessary data for the user, and a translation system for translating the data into a predefined display standard that is customized for the user; and
   an export system for formatting the processed flat file into a report file and for exporting the report file from the second server system to the third sever system, wherein the export system comprises a formatting system for formatting the processed flat file into a report file, and an export schedule system for exporting the report file from the second server system to the third server system according to a predefined export schedule.

25. The system of claim 24, wherein each server system comprises a database, an wherein the imported data is stored on the database of the second server system.

26. The system of claim 24, wherein the import system and the export system access a database of the second server system to provide configuration rules, import schedule rules, parsing rules, editing rules, translation rules, formatting rules, and export schedule rules.

27. A program product stored on a recordable medium for transferring data between server systems, comprising:
   an import system for importing data as a flat file from a first server system to a second server system according to predefined configuration rules and import schedule rules, and for customizing the imported data on the second server system for a user of a third servers system according to user defined parsing rules, editing rules, and translation rules; and
   an export system for formatting the processed flat file into a report file according to user defined formatting rules, and for exporting the report file from the second server system to a third sever system according to predefined export schedule rules.

28. The program product of claim 27, wherein the configuration rules locate the flat file, wherein the impart schedule rules import the flat file from the first server system according to a predefined schedule, wherein the parsing rules identify data point in the flat file, wherein the editing rules edit the data, and wherein the translation rules translate the data into a predefined display standard.

29. The program product of claim 27, wherein the formatting rules format the processed data into a report file, and wherein the export schedule rules export the report file to the third server system according to a predefined schedule.

30. The program product of claim 27, wherein each server system comprises database, and wherein the imported data is stored on the database of the second server system.

31. The program product of claim 27, wherein the file is an ASCII flat file.

* * * * *